US012167161B1

(12) United States Patent  
Eljaik Gómez et al.

(10) Patent No.: US 12,167,161 B1  
(45) Date of Patent: Dec. 10, 2024

(54) SYSTEMS AND METHODS FOR HORIZON LEVELING VIDEOS

(71) Applicant: GoPro, Inc., San Mateo, CA (US)

(72) Inventors: Jorhabib Eljaik Gómez, San Mateo, CA (US); Nicolas Rahmouni, Paris (FR); Guillaume Brigot, San Mateo, CA (US); Luis Mario Domenzain, San Mateo, CA (US); Vincent Riauté, Carrieres sous Poissy (FR)

(73) Assignee: GoPro, Inc., San Mateo, CA (US)

( * ) Notice: Subject to any disclaimer, the term of this patent is extended or adjusted under 35 U.S.C. 154(b) by 118 days.

(21) Appl. No.: 18/182,084

(22) Filed: Mar. 10, 2023

Related U.S. Application Data

(60) Provisional application No. 63/406,092, filed on Sep. 13, 2022.

(51) Int. Cl.  
*H04N 5/262* (2006.01)  
*G06T 3/60* (2024.01)  
*H04N 23/68* (2023.01)

(52) U.S. Cl.  
CPC .............. *H04N 5/2628* (2013.01); *G06T 3/60* (2013.01); *H04N 23/6811* (2023.01); *H04N 23/683* (2023.01)

(58) Field of Classification Search  
CPC .............. H04N 5/2628; H04N 23/6811; H04N 23/683; G06T 3/60  
See application file for complete search history.

(56) References Cited

U.S. PATENT DOCUMENTS

| | | | |
|---|---|---|---|
| 11,336,832 B1* | 5/2022 | Stimm | G06T 3/60 |
| 11,528,430 B2* | 12/2022 | Douady | H04N 23/45 |
| 2015/0254871 A1* | 9/2015 | MacMillan | H04N 21/233 |
| | | | 382/180 |
| 2016/0088287 A1* | 3/2016 | Sadi | H04N 13/243 |
| | | | 348/43 |
| 2016/0283097 A1* | 9/2016 | Voss | H04N 23/635 |
| 2017/0118458 A1* | 4/2017 | Gronholm | G02B 30/34 |
| 2017/0142337 A1* | 5/2017 | Kokaram | H04N 23/683 |
| 2018/0160194 A1* | 6/2018 | Bayliss | H04N 21/6543 |
| 2019/0189160 A1* | 6/2019 | Huang | H04N 23/60 |

* cited by examiner

*Primary Examiner* — Shahbaz Nazrul  
(74) *Attorney, Agent, or Firm* — ESPLIN & ASSOCIATES, PC

(57) ABSTRACT

A constraint model that includes a representation of feasible viewing window placement within a source field of view of visual content may be generated by using a roll-pitch-yaw axes representation of viewing window placement and having a diagonal dimension of the viewing window that fit within vertical and horizonal dimensions of the source field of view. The constraint model may enable full horizon leveling of the visual content.

20 Claims, 8 Drawing Sheets

SYSTEMS AND METHODS FOR HORIZON LEVELING VIDEOS

FIELD

This disclosure relates to horizon leveling videos using a constraint model that is generated to cover 180 degrees of roll angle for a viewing window and enable full horizon leveling.

BACKGROUND

A video may be stabilized to provide a smoother/less jerky view and rotated to provide a horizon-leveled view of the captured scene. Use of a constraint model that does not cover full roll angle for horizon leveling may result in only partial horizon leveling of the visual content.

SUMMARY

This disclosure relates to horizon leveling videos. Video information, viewing window placement information, constraint model information, and/or other information may be obtained. The video information may define a video. The video may include video content having a progress length. The video content may include visual content having a source field of view. The source field of view may have a vertical dimension and a horizontal dimension. The viewing window placement information for the video may define placement of a viewing window for the visual content as the function of progress through the progress length. The viewing window may define extents of the visual content to be included within horizon-leveled visual content as the function of progress through the progress length. The viewing window may have a punchout field of view. The punchout field of view may have a diagonal dimension. The constraint model information for the video may define a constraint model for the video. The constraint model for the video may include a representation of feasible viewing window placement in which entirety of the punchout field of view of the viewing window is contained within the source field of view of the visual content. The representation of feasible viewing window placement may be generated based on a roll-pitch-yaw axes representation of viewing window placement and the diagonal dimension of the punchout field of view fitting within the vertical dimension and the horizontal dimension of the source field of view of the visual content to cover 180 degrees of roll angle for the viewing window and enable full horizon leveling.

Modified placement of the viewing window may be determined based on the placement of the viewing window failing to satisfy the constraint model for the video and/or other information. The horizon-leveled visual content may be generated based on the modified placement of the viewing window and/or other information. The horizon-leveled visual content may include a punchout of the extents of the visual content defined by the viewing window. Inclusion of the extents of the visual content defined by the viewing window within the horizon-leveled visual content may effectuate horizon leveling of the visual content.

A system for horizon leveling videos may include one or more electronic storage, processor, and/or other components. The electronic storage may store video information, information relating to a video, information relating to video content, information relating to visual content, information relating to a viewing window, viewing window placement information, information relating to placement of a viewing window, constraint model information, information relating to a constraint model, information relating to modified placement of a viewing window, information relating to horizon-leveled visual content, and/or other information.

The processor(s) may be configured by machine-readable instructions. Executing the machine-readable instructions may cause the processor(s) to facilitate horizon leveling videos. The machine-readable instructions may include one or more computer program components. The computer program components may include one or more of a video component, a placement component, a constraint model component, a modified placement component, a generation component, and/or other computer program components.

The video component may be configured to obtain video information and/or other information. The video information may define a video. The video may include video content having a progress length. The video content may include visual content having a source field of view, the source field of view having a vertical dimension and a horizontal dimension The placement component may be configured to obtain viewing window placement information for the video and/or other information. The viewing window placement information for the video may define placement of a viewing window for the visual content as the function of progress through the progress length of the video. The viewing window may define extents of the visual content to be included within horizon-leveled visual content as the function of progress through the progress length. The viewing window may have a punchout field of view. The punchout field of view may have a diagonal dimension.

The constraint model component may be configured to obtain constraint model information for the video and/or other information. The constraint model information for the video may define a constraint model for the video. The constraint model for the video may include a representation of feasible viewing window placement in which entirety of the punchout field of view of the viewing window is contained within the source field of view of the visual content. The representation of feasible viewing window placement may be generated based on a roll-pitch-yaw axes representation of viewing window placement, the diagonal dimension of the punchout field of view fitting within the vertical dimension and the horizontal dimension of the source field of view of the visual content, and/or other information. The representation of feasible viewing window placement may be generated to cover 180 degrees of roll angle for the viewing window and enable full horizon leveling.

In some implementations, the diagonal dimension of the punchout field of view fitting within the vertical dimension and the horizontal dimension of the source field of view of the visual content may include the diagonal dimension of the punchout field of view being smaller than or equal to smaller of the vertical dimension and the horizontal dimension of the source field of view of the visual content.

In some implementations, the roll-pitch-yaw axes representation of viewing window placement may include a three-dimensional vector with a roll angle component, a pitch angle component, and a yaw angle component.

In some implementations, the representation of feasible viewing window placement may include a three-dimensional representation of feasible viewing window placement.

The modified placement component may be configured to determine modified placement of the viewing window. The modified placement of the viewing window may be determined based on the placement of the viewing window failing to satisfy the constraint model for the video and/or other information.

In some implementations, the placement of the viewing window failing to satisfy the constraint model for the video may include a first placement of the viewing window extending beyond a surface of the three-dimensional representation of feasible viewing window placement. In some implementations, the modified placement of the viewing window may be determined to include a first modified placement for the first placement of the viewing window. The first modified placement may be located on the surface of the three-dimensional representation of feasible viewing window placement.

In some implementations, the modified placement of the viewing window may be determined to maintain a roll angle of the placement of the viewing window. Responsive to the first placement of the viewing window including a first roll angle, the first modified placement for the first placement of the viewing window may be determined to include the first roll angle. The modified placement of the viewing window may be determined to include change in a pitch angle and/or a yaw angle of the placement of the viewing window. The pitch angle and/or the yaw angle of the placement of the viewing window may be changed to position the modified placement of the viewing window on a closest point of the surface of the three-dimensional representation of feasible viewing window placement.

The generation component may be configured to generate the horizon-leveled visual content based on the modified placement of the viewing window and/or other information. The horizon-leveled visual content may include a punchout of the extents of the visual content defined by the viewing window. Inclusion of the extents of the visual content defined by the viewing window within the horizon-leveled visual content may effectuate horizon leveling of the visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
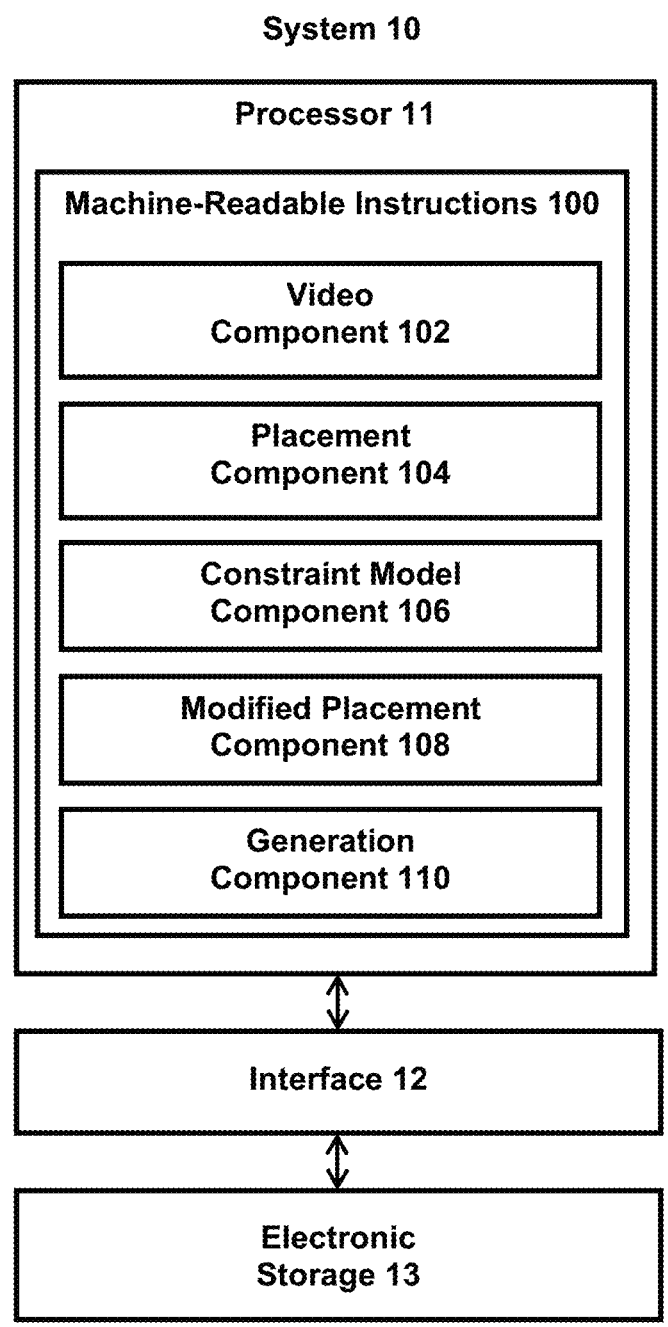
FIG. 1 illustrates an example system for horizon leveling videos.

FIG. 1 illustrates a system 10 for horizon leveling videos. The system 10 may include one or more of a processor 11, an interface 12 (e.g., bus, wireless interface), an electronic storage 13, and/or other components. In some implementations, the system 10 may include one or more optical elements, one or more image sensors, one or more position sensors, and/or other components. Video information, viewing window placement information, constraint model information, and/or other information may be obtained by the processor 11. The video information may define a video. The video may include video content having a progress length. The video content may include visual content having a source field of view. The source field of view may have a vertical dimension and a horizontal dimension. The viewing window placement information for the video may define placement of a viewing window for the visual content as the function of progress through the progress length. The viewing window may define extents of the visual content to be included within horizon-leveled visual content as the function of progress through the progress length. The viewing window may have a punchout field of view. The punchout field of view may have a diagonal dimension. The constraint model information for the video may define a constraint model for the video. The constraint model for the video may include a representation of feasible viewing window placement in which entirety of the punchout field of view of the viewing window is contained within the source field of view of the visual content. The representation of feasible viewing window placement may be generated based on a roll-pitch-yaw axes representation of viewing window placement and the diagonal dimension of the punchout field of view fitting within the vertical dimension and the horizontal dimension of the source field of view of the visual content to cover 180 degrees of roll angle for the viewing window and enable full horizon leveling.

Modified placement of the viewing window may be determined by the processor 11 based on the placement of the viewing window failing to satisfy the constraint model for the video and/or other information. The horizon-leveled visual content may be generated by the processor 11 based on the modified placement of the viewing window and/or other information. The horizon-leveled visual content may include a punchout of the extents of the visual content defined by the viewing window. Inclusion of the extents of the visual content defined by the viewing window within the horizon-leveled visual content may effectuate horizon leveling of the visual content.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, information relating to video content, information relating to visual content, information relating to a viewing window, viewing window placement information, information relating to placement of a viewing window, constraint model information, information relating to a constraint model, information relating to modified placement of a viewing window, information relating to horizon-leveled visual content, and/or other information.

Visual content (of image(s), of video frame(s), of video(s)) with a field of view may be captured by an image capture device during a capture duration. Visual content may refer to content of image(s), video frame(s), and/or video(s) that may be consumed visually. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), and/or position sensor(s) of the system 10 may be carried by the housing of the image capture device. The housing may carry other components, such as the processor 11 and/or the electronic storage 13.

An image capture device may refer to a device for recording visual information in the form of images, videos, and/or other media. An image capture device may be a standalone device (e.g., camera) or may be part of another device (e.g., part of a smartphone, tablet). An image sensor may include sensor(s) that converts received light into output signals. The output signals may include electrical signals. For example, an image capture device may include one or more of a charge-coupled device sensor, an active pixel sensor, a complementary metal-oxide semiconductor sensor, an N-type metal-oxide-semiconductor sensor, and/or other image sensors. An image sensor may generate output signals conveying information that defines visual content of one or more images and/or one or more video frames of a video. For example, an image sensor may be configured to generate a visual output signal based on light that becomes incident thereon during a capture duration. The visual output signal may convey visual information that defines visual content having a field of view.

An optical element may include instrument(s), tool(s), and/or medium that acts upon light passing through the instrument(s)/tool(s)/medium. For example, an optical element may include one or more of lens, mirror, prism, and/or other optical elements. An optical element may affect direction, deviation, and/or path of the light passing through the optical element. An optical element may have a field of view. An optical element may be configured to guide light within a field of view to an image sensor. A field of view may include a field of view of a scene that is received by the optical element and/or the field of view of the scene that is delivered to the image sensor. For example, an optical element may guide light within its field of view to the image sensor or may guide light within a portion of its field of view to the image sensor. The field of view of the optical element may refer to the extent of the observable world that is seen through the optical element. The field of view of the optical element may include one or more angles (e.g., vertical angle, horizontal angle, diagonal angle) at which light is received and passed on by the optical element to the image sensor. In some implementations, the field of view may be greater than or equal to 180 degrees. In some implementations, the field of view may be smaller than or equal to 180 degrees. Other fields of view are contemplated.

A position sensor may include sensor(s) that measures experienced positions and/or motions. A position sensor may convert experienced positions and/or motions into output signals. The output signals may include electrical signals. For example, a position sensor may refer to a set of position sensors, which may include one or more inertial measurement units, one or more accelerometers, one or more gyroscopes, one or more magnetometers, and/or other position sensors. A position sensor may generate output signals conveying information that characterizes positions (e.g., rotational position, translational position) and/or motions (e.g., rotational motion, translational motion) of the position sensor and/or device(s) carrying the position sensor, such as the image capture device and/or the housing of the image capture device.

The visual content captured by the image capture device may be horizon leveled, stabilized, and/or otherwise modified. The visual content may be horizon level and/or stabilized based on the positions and/or motions of the image capture device during visual content capture. Information that characterizes position and/or motions of the image capture device may be used to offset/counter tilt and/or shaking of the image capture device during visual content capture.

Horizon leveling of visual content may refer to modifying or punching out a portion of the visual content to depict a leveled scene. Horizon leveling of visual content may refer to modifying or punching out a portion of the visual content so that the scene depicted within the visual content is leveled with respect to ground, sea, earth, and/or the horizon. Horizon leveling of visual content may refer to modifying or punching out a portion of the visual content so that the depicted scene appears to have been captured by an upright image capture device (non-tilted image capture device).

Stabilization of visual content may refer to modifying or punching out a portion of the visual content to depict a stabilized scene. Stabilization of visual content may refer to modifying or punching out a portion of the visual content so that the scene depicted within the visual content appears more stable than in the original visual content. Stabilization of visual content may include reduction/removal of motion present in the visual content due to motion (e.g., mechanical displacement, rotational motion, translational motion) of the image capture device during visual content capture.

Figure 3A:
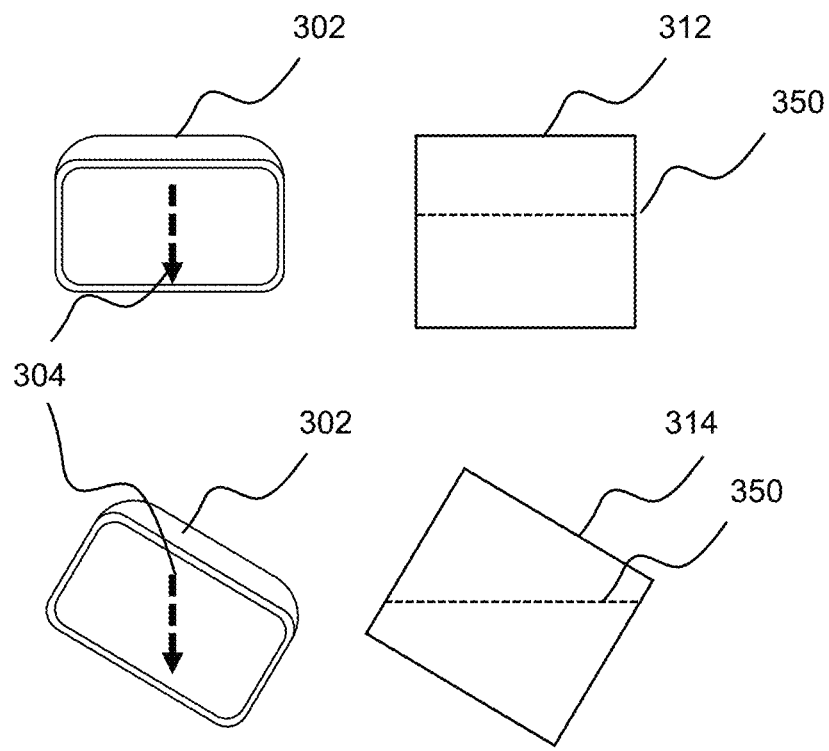
FIGS. 3A and 3B illustrate example images captured by an image capture device from different rotational positions.
Figure 3B:
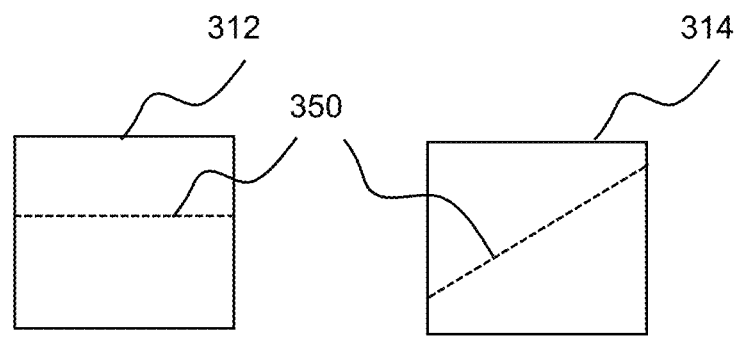

For example, FIGS. 3A and 3B illustrate example images 312, 314 captured by an image capture device 302 from different rotational positions. Gravity direction on the image capture device 302 during capture of the images 312, 314 is shown by an arrow 304. The image 312 may be captured by the image capture device 302 while the image capture device 302 is leveled with respect to ground. The image 312 may include visual content depicting a leveled scene within the field of view of the image capture device 302. For example, the image 312 may include visual content depicting a horizon 350 that is leveled. The image 314 may be captured by the image capture device 302 while the image capture device 302 is rotated to the right. Tilt of the image capture device 302 may cause the visual content captured by the image capture device 302 to depict a non-leveled scene. The image 314 may include visual content depicting a tilted scene within the field of view of the image capture device 302. For example, the image 314 may include visual content depicting a horizon 350 that is tilted. FIG. 3B illustrates how the images 312, 314 may be shown on a display. As shown in FIG. 3B, capture of the image 314 by the image capture device 304 in a tilted position may result in the horizon 350 not being leveled within a presentation of the image 314.

The visual content captured by the image capture device may be leveled and/or stabilized as a function of progress through the progress length of the visual content based on the rotational positions of the image capture device as the function of progress through the capture duration and/or other information. The visual content captured by the image captured device may be rotated to compensate for rotation of the image capture device during the capture duration such that a view of the visual content includes depiction of stabilized and/or leveled scene. For example, readings from the position sensor may be used to determine the direction of gravity when visual content is captured at different moments within the capture duration. The direction of gravity may be used to determine the amount of rotation that needs to be applied to the visual content to level the depiction within the visual content. For instance, the visual content may be rotated so that the direction of gravity is pointed downwards or the viewing window may be rotated so that the direction of gravity within the viewing window is pointed downwards. Readings from the position sensor may be used to determine how the image capture device moved during the capture duration and the direction and amount of image capture device movement may be used to determine which portions of the visual content should be punched out to stabilize the visual content.

Horizon leveling and/or stabilization of the visual content may be performed based on placement of a viewing window within the field of view of the visual content. A viewing window may define extents of the visual content (e.g., of image(s)/video frame(s)) to be included within a punchout. The viewing window placement may be determined so that the visual content within the viewing window does not include tilt or includes less tilt from horizon than the original visual content. The viewing window placement may be determined so that the visual content within the viewing window does not include or includes less motion (e.g., less shaking) than the original visual content.

The placement of the viewing window may compensate for the rotation (tilt) and/or movement (shaking) of the image capture device during the capture duration. For example, a viewing window having a smaller size than the field of view of the visual content may be used to provide a punchout of the visual content. A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial portions of the visual content. The punchout (cropped view) may be rotated within the field of view to provide a horizon-leveled view of the visual content. The placement of the punchout may be moved within the field of view to provide a stabilized view of the visual content.

Figure 4:
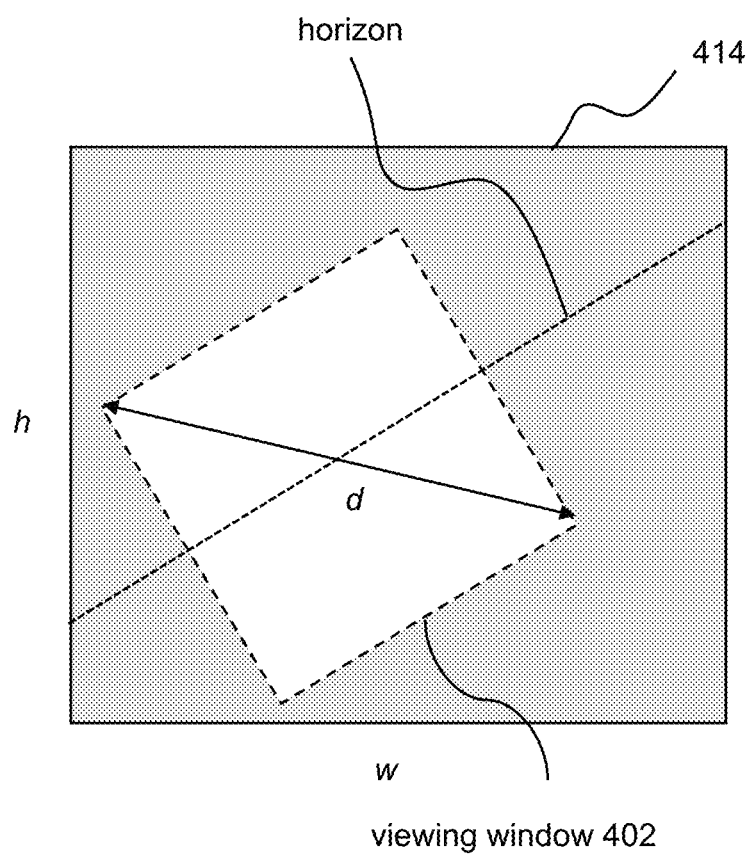
FIG. 4 illustrates example viewing window placement for an image.

FIG. 4 illustrates example viewing window placement for an image 414. The image 414 may be captured by an image capture device that is rotated to the right with respect to ground. For example, the image 414 may be captured by the image capture device 402 rotated to the right to capture the image 414. Such rotation of the image capture device may result in the visual content including tilted depiction of the scene. Viewing the image 514 may show upright objects within the scene to be depicted as being tilted to the left. The image 414 may be captured by an image capture device experiencing motion (e.g., shaking). For example, the image capture device may not be steady when capturing the image 414 and other (preceding, following) images. Such movement of the image capture device may result in the visual content including a shaky depiction of the scene. Viewing the image 414 and other images (as video frames of a video) may show the depicted scene moving (e.g., shaking).

A horizon-leveled and stabilized view of the image 414 may be generated by using a viewing window 402. The viewing window 402 may define an extent of the image 414 to be used in generating the horizon-leveled and stabilized view of the image 414. The portion of the image 414 within the viewing window 402 may be used in generating the horizon-leveled and stabilized view of the image 414.

The dimension/field of view (e.g., shape, size) of the viewing window may be set/controlled so that the diagonal dimension (d) of the viewing window 402 fits within the vertical dimension (h) and the horizontal dimension (w) of the image 414/field of view of the image 414. The diagonal dimension (d) fitting within the vertical dimension (h) and the horizontal dimension (w) may include the diagonal dimension (d) being smaller than the vertical dimension (h) and the horizontal dimension (w). The diagonal dimension (d) fitting within the vertical dimension (h) and the horizontal dimension (w) may include the diagonal dimension (d) being the same as the smaller of the vertical dimension (h) and the horizontal dimension (w).

The placement of the viewing window may be determined to compensate for tilt and/or motion of the image capture device during capture of visual content. The placement of the viewing window may refer to orientation of the viewing window with respect to the field of view of the visual content. The placement of the viewing window may refer to how the viewing window is positioned within the field of view of the visual content. The placement of the viewing window may be defined by one or more of rotation, location, shape, size, and/or other characteristics of the viewing window. For example, the placement of the viewing window may be defined by where the center of the viewing window is located within the field of view of the visual content and how (in what direction and by what amount) the viewing window is rotated. The viewing window may be used to provide a punchout of the visual content, and the punchout may be rotate and moved within the field of view of the visual content to provide a horizon leveled and stabilized view of the visual content.

A constraint model may be used to control placement of the viewing window for the visual content. A constraint model may refer to a model that places/defines limitation(s) and/or restriction(s) on placement of the viewing window for the visual content. A constraint model may restrict/limit how and/or where the viewing window may be placement with respect to the field of view of the visual content.

A constraint model may include a representation of feasible viewing window placement for the visual content. Feasible viewing window placement for the visual content may refer to placement of viewing window that keeps the entirety of the viewing window within the visual content. Feasible viewing window placement for the visual content may refer to placement of viewing window that keeps field of view of the viewing window (punchout field of view) within the field of view of the visual content (source field of view). A viewing window placement that is within (e.g., on the surface of, within the volume of) the representation may be a feasible viewing window placement.

Figure 5:
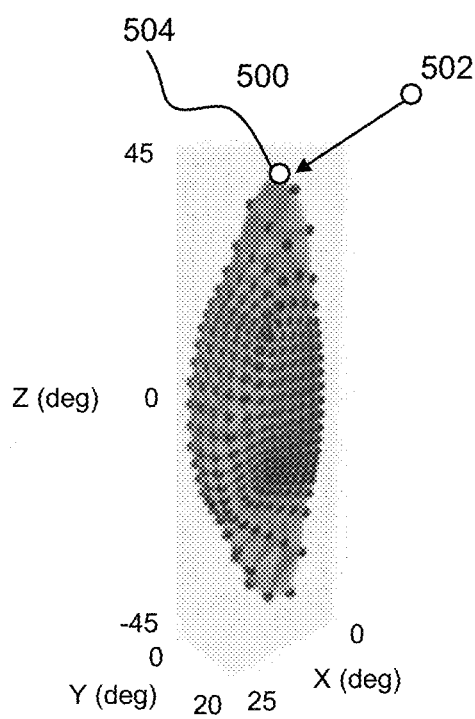
FIG. 5 illustrates an example constraint model.

FIG. 5 illustrates an example constraint model 500. The constraint model 500 may have been generated based on an axis-angle representation of viewing window placement. The axis-angle representation may define the placement of a viewing window by defining (1) the direction of an axis of rotation, and (2) the amount of rotation about the axis of rotation. The X and Y axes of the constraint model 500 may correspond to pitch and yaw angles for a viewing window, and the Z axis of the constraint model 500 may correspond to roll angle for the viewing window. As shown in FIG. 5, the constraint model 500 may cover a partial range of Z-angles. The constraint model 500 may not cover 180 degrees of Z-angles. The constraint model 500 may cover Z-angles between −45 degrees and +45 degrees. The constraint model 500 may be discontinuous beyond −45/+45 degrees. The constraint model 500 may not cover 180 degrees of roll angle and thus may not enable full horizon leveling. That is, using the constraint model 500 may result in horizon leveling being applied only when the roll (rotation) of the viewing window stays within −45 degrees to +45 degrees.

An example projection to the surface of the constraint model 500 is shown in FIG. 5. Placement of a viewing window may be originally located at a point 502 outside the constraint model 500. The viewing window placement at the point 502 may be determined for a particular moment in a video (for a particular video frame) to apply horizon leveling and stabilization to the video. The roll (rotation) required for the point 502 may be greater than 45 degrees. The viewing window placement may be projected from the point 502 to a point 504 on the surface of the constraint model 500 (e.g., at 45 degrees). The point 502 and the point 504 may not be on the same Z-plane. The projection shown in FIG. 5 may change the roll of the viewing window for the video (for the particular video frame) and cause the video (the particular video frame) to not be horizon leveled.

Figure 6:
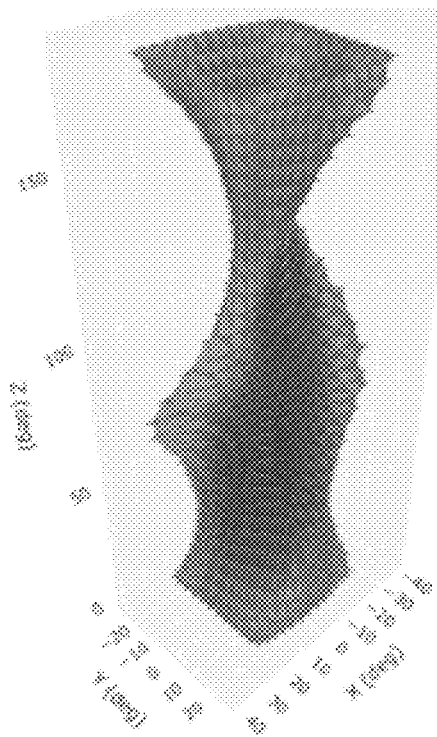
FIG. 6 illustrates an example constraint model.

FIG. 6 illustrates an example constraint model 600. The constraint model 600 may have been generated based on a roll-pitch-yaw axes representation of viewing window placement. The roll-pitch-yaw axes representation may define the placement of a viewing window by defining (1) the amount of rotation about the roll axis, (2) the amount of rotation about the pitch axis, and (3) the amount of rotation about the yaw axis. The roll-pitch-yaw axes representation may include a three-dimensional vector with a roll angle component, a pitch angle component, and a yaw angle component. The roll angle component (the roll vector) may define the amount of rotation about the roll axis. The pitch angle component (the pitch vector) may define the amount of rotation about the pitch axis. The yaw angle component (the yaw vector) may define the amount of rotation about the yaw axis. The constraint model 600 may be generated using a viewing window with a diagonal dimension that fits within the vertical and horizontal dimensions of the visual content.

As shown in FIG. 6, constraint model 600 may cover a full range of Z-angles. The constraint model 600 may cover 180 degrees of Z-angles. The constraint model 600 may cover Z-angles between 0 degrees and 180 degrees. The constraint model 600 may be continuous across 180 degrees. The constraint model 600 may cover 180 degrees of roll angle and thus may enable full horizon leveling. That is, using the constraint model 600 may result in horizon leveling being applied for any amount of roll (rotation) of the viewing window.

Figure 7:
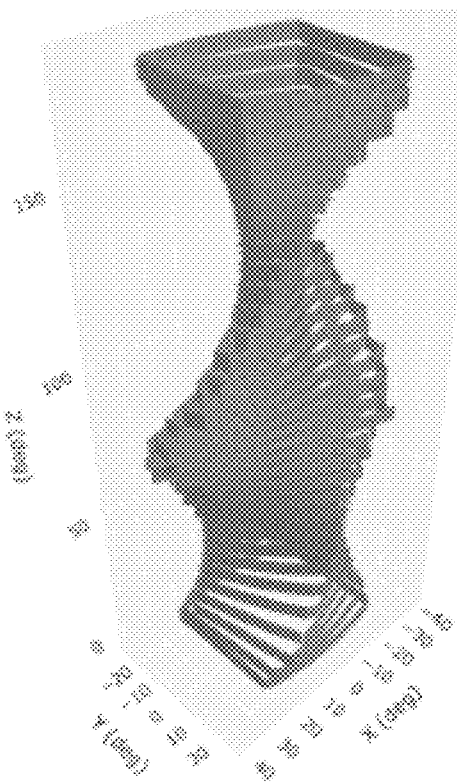
FIG. 7 illustrates an example constraint model.

In some implementations, the constraint model may be generated by performing computation for a partial range of angles. For example, while the constraint model 600 in FIG. 6 is shown for roll angle between 0 degrees and 180 degrees, symmetry of rotations may enable the constraint model 600 to be generated using computation for half of the roll angles (e.g., between 0 degrees and 90 degrees). In some implementations, the resolution of the constraint model may be controlled. The smoothness of the constraint model may be controlled (e.g., smoothness increased/decreased) to change computational requirements of utilizing the constraint model. For example, FIG. 7 illustrates a constraint model 700. The constraint model 700 may include a smoothness-reduced (e.g., lower resolution) version of the constraint model 600. Using the constraint model 700 rather than the constraint model 600 may result in reduced computational requirement (e.g., less processing power/time required) at the expense of lower performance (e.g., viewing window placement not being as precise).

Referring back to FIG. 1, the processor 11 (or one or more components of the processor 11) may be configured to obtain information to facilitate horizon leveling videos. Obtaining information may include one or more of accessing, acquiring, analyzing, determining, examining, generating, identifying, loading, locating, opening, receiving, retrieving, reviewing, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a position sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate horizon leveling videos. The machine-readable instructions 100 may include one or more computer program components. The machine-readable instructions 100 may include one or more of a video component 102, a placement component 104, a constraint model component 106, a modified placement component 108, a generation component 110, and/or other computer program components.

The video component 102 may be configured to obtain video information and/or other information. Obtaining video information may include one or more of accessing, acquiring, analyzing, determining, examining, generating, identifying, loading, locating, opening, receiving, retrieving, reviewing, storing, and/or otherwise obtaining the video information. The video component 102 may obtain video information from one or more hardware components (e.g., an image sensor) and/or one or more software components (e.g., software running on a computing device).

In some implementations, the video component 102 may obtain video information based on user interaction with a user interface/application (e.g., video editing application, video player application), and/or other information. For example, a user interface/application may provide option(s) for a user to select one or more videos that are to be horizon-leveled, stabilized, and/or played. The video information defining the video may be obtained based on the user's selection of the video content through the user interface/video application. Other selections of video are contemplated.

The video information may define a video. The video information may define a video by including information that defines one or more content, qualities, attributes, features, and/or other aspects of the video. For example, video information may define a video by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. For example, the video information may include information that makes up and/or is used to determine pixels of video frames of the video. Other types of video information are contemplated.

The video component 102 may obtain video information defining a video while an image capture device is capturing the video. The video component 102 may obtain video information defining a video after the video has been captured and stored in memory (e.g., the electronic storage 13).

The video may include video content captured by an image capture device during a capture duration. The video content may have a progress length. The progress length of the video content may correspond to the capture duration for the video. The progress length of the video content may be determined based on the capture duration. The progress length of the video content may be same as the capture duration, shorter than the capture duration (e.g., playback rate of the video content is faster than the capture rate of the video content), and/or longer than the capture duration (e.g., playback rate of the video content is slower than the capture rate of the video content).

The video content may include visual content of one or more scenes captured by an image capture device during the capture duration. A scene may refer to a place and/or a location in which the image capture device is located while capturing visual content. A scene may include one or more portions of a place and/or a location at which the image capture device is directed during capture of the visual content. A scene may include one or more portions of a place and/or a location that are within the field of view of the image capture device during capture of the visual content. A scene may include static things (e.g., environment, non-moving objects) and/or dynamic things (e.g., moving objects). The video content may include visual content captured at different moments within the capture duration. The visual content may be viewable as a function of progress through the progress length.

The visual content may have a field of view. The field of view of the visual content may be referred to as a source field of view. The field of view of the visual content may have a vertical dimension, a horizontal dimension, and/or other dimensions. For example, referring to FIG. 4, the visual content of the video may have a source field of view with height of h and width of w. Other sizes and shapes/aspect ratios of visual content are contemplated.

The video content may include other content, such as audio content. Audio content may be captured during capture of the visual content (e.g., recording of sound captured with the images/video frames) and/or may be captured separately from the capture of the visual content (e.g., song/music provide accompaniment for the playback of the images/video frames, sound recorded before/after capture of the images/video frames). Audio content may include audio/sound captured (e.g., by sound sensor(s), microphone(s)) with the capture of the visual content and/or audio/sound provided as an accompaniment for the visual content. Audio content may include one or more of voices, activities, songs, music, and/or other audio/sounds. For example, audio content may include sounds captured by a single sound sensor or an array of sound sensors. The sound sensor(s) may receive and convert sounds into output signals. The output signals may convey sound information and/or other information. The sound information may define audio content in one or more formats, such as WAV, MP3, MP4, RAW. Audio content may include audio/sound generated by one or more computing devices, such as procedural audio. Audio content may be synchronized with the visual content. For example, audio content may include music, song, and/or soundtrack, and the visual content of the video content may be synchronized with music, song, and/or soundtrack.

The placement component 104 may be configured to obtain viewing window placement information for the video and/or other information. Obtaining viewing window placement information may include one or more of accessing, acquiring, analyzing, determining, examining, generating, identifying, loading, locating, opening, receiving, retrieving, reviewing, storing, and/or otherwise obtaining the viewing window placement information. The placement component 104 may obtain viewing window placement information from one or more hardware components and/or one or more software components (e.g., software running on a computing device).

The viewing window placement information for the video may define placement of one or more viewing windows for the visual content. The viewing window placement information may define placement of a viewing windows for the visual content by including information that defines one or more content, qualities, attributes, features, and/or other aspects of the viewing windows for the visual content. For example, the viewing window placement information may define placement of a viewing windows for the visual content by including information that specifies, indicates, identifies, and/or is used to determine where and how the viewing window is to be positioned with respect to the visual content. For instance, the viewing window placement information may include information that specifies and/or is used to determine the center location of the viewing window within the source field of view, along with in what direction and by what amount the viewing window should be rotated. Other types of viewing window placement information are contemplated.

A viewing window may define extents of the visual content to be included within horizon-leveled visual content as the function of progress through the progress length. The viewing window may define which spatial portions of the visual content are included within the horizon-leveled visual content at different moment within the progress length. Inclusion of the extents of the visual content defined by the viewing window within the horizon-leveled visual content may effectuate leveling of the visual content.

A viewing window may define extents of the visual content to be included within a punchout of the visual content as the function of progress through the progress length. A viewing window may correspond to the entire progress length or for one or more portions (points, moments) of the progress length. The punchout of the visual content may be presented on one or more displays, included in one or more videos, and/or otherwise used for presenting horizon-leveled view of the visual content.

The viewing window may have a field of view. The field of view of the viewing window may be referred to as a punchout field of view. The punchout field of view of the viewing window may have a diagonal dimension and/or other dimensions. For example, referring to FIG. 4, the viewing window may have a punchout field of view with a diagonal of d. Other sizes and shapes/aspect ratios of viewing window are contemplated. Shape/aspect ratio of viewing window may be same or different from shape/aspect ratio of visual content.

The placement of the viewing window may include how the viewing window is placed/oriented with respect to the visual content. The placement of the viewing window may include how the punchout field of view is placed/oriented with respect to the source field of view. The viewing window placement information may define one or more of rotation, location, shape, size, and/or other characteristics of the viewing window. For example, the viewing window placement information may define (e.g., specify, indicate, identify, used to determine) where the center of the punchout field of view of the viewing window is located within the source field of view of the visual content and how (in what direction and by what amount) the punchout field of view is rotated. The center of the punchout field of view may be defined by a pitch angle and a yaw angle and the rotation of the punchout field of view may be defined by a roll angle.

The placement of a viewing window for the visual content may be defined as the function of progress through the progress length of the video. Separate placement of the viewing window may be defined for different moments within the progress length of the video. The placement of a viewing window for the visual content may be determined based on user input, analysis of visual content capture, analysis of visual content, and/or other information. For example, where and how the viewing window should be located for different moments within the video may be controlled by a user. Where and how the viewing window should be located for different moments within the video may be determined based on how the video was captured (e.g., positions/motions experienced by the image capture device during capture) and/or analysis of the video to horizon level and/or stabilize the video. For example, the placement of the viewing window for the visual content may be determined so that output of the spatial portions of the visual content within the viewing window results in the output visual content being more horizon leveled and/or more stabilized than the original visual content. The placement of the viewing window for the visual content may be determined so that output of the spatial portions of the visual content within the viewing window results in the output visual content being horizon leveled and/or stabilized.

The constraint model component 106 may be configured to obtain constraint model information for the video and/or other information. Obtaining constraint model information may include one or more of accessing, acquiring, analyzing, determining, examining, generating, identifying, loading, locating, opening, receiving, retrieving, reviewing, storing, and/or otherwise obtaining the constraint model information. The constraint model component 106 may obtain constraint model information from one or more hardware components and/or one or more software components (e.g., software running on a computing device).

The constraint model information for the video may define a constraint model for the video. The constraint model information may define a constraint model for the video by including information that defines one or more content, qualities, attributes, features, and/or other aspects of the constraint model for the video. For example, the constraint model information may define a constraint model for the video by including information that defines one or more content, qualities, attributes, features, and/or other aspects of the representation of feasible viewing window placement for the video. For example, the constraint model information may include information that makes up and/or is used to determine the shape, size, and/or other character like of the representation of feasible viewing window placement for the video. Other types of constraint model information are contemplated.

The constraint model for the video may include a representation of feasible viewing window placement in which entirety of the punchout field of view of the viewing window is contained within the source field of view of the visual content. The representation of feasible viewing window placement may include a three-dimensional representation of feasible viewing window placement and/or other dimensional representation of feasible viewing window placement. Example three-dimensional representations of feasible viewing window placement are shown in FIGS. 6 and 7.

The representation of feasible viewing window placement may be generated based on a roll-pitch-yaw axes representation of viewing window placement, the diagonal dimension of the punchout field of view fitting within the vertical dimension and the horizontal dimension of the source field of view of the visual content, and/or other information. The representation of feasible viewing window placement may be generated using a viewing window that is sized so that the diagonal dimension of the punchout field of view fits within the vertical dimension and the horizontal dimension of the source field of view (e.g., the diagonal dimension of the punchout field of view is equal to or smaller than smaller of the vertical and horizontal dimensions of the source field of view). The diagonal dimension of the punchout field of view fitting within the vertical dimension and the horizontal dimension of the source field of view of the visual content may include the diagonal dimension of the punchout field of view being smaller than or equal to smaller of the vertical dimension and the horizontal dimension of the source field of view of the visual content. Such sizing of the viewing window may enable full horizon leveling of the visual content.

The representation of feasible viewing window placement may be generated based on a roll-pitch-yaw axes representation of viewing window placement that includes a three-dimensional vector with a roll angle component, a pitch angle component, and a yaw angle component. The placement of the viewing window may be decomposed into amounts of rotations about the roll axis, the pitch axis, and the yaw axis. The placement of the viewing window may be first decomposed by roll before pitch and yaw to prioritize horizon level (e.g., over stabilization). The representation of feasible viewing window placement may be generated to cover 180 degrees of roll angle for the viewing window and enable full horizon leveling. An example representation of feasible viewing window placement that covers 180 degrees or roll angle for the viewing window and enable full horizon leveling of visual content is shown in FIGS. 6 and 7.

The representation of feasible viewing window placement may be generated by checking whether different placements of the viewing window results in the viewing window being placed wholly inside the source field of view or one or more parts of the viewing window being placed outside the source field of view. Check on whether viewing window is wholly within the source field of view/one or more parts of the viewing window is outside the source field of view may be made by checking whether certain points/locations along the edge of the viewing window is within or outside the source field of view. That is, rather than checking whether every part of the viewing window is inside or outside the source field of view, a certain number of points/locations along the periphery of the viewing window may be checked to determine whether those points/locations are within or outside the source field of view. When all of those points/locations are determined to be within the source field of view, the particular placement of the viewing window may be determined to include the entirety of the viewing window within the source field of view. When one or more of those points/locations are determined to be outside the source field of view, the particular placement of the viewing window may be determined to not include the entirety of the viewing window within the source field of view.

The representation of feasible viewing window placement may be generated using a cube map with cells that represent different ranges of viewing window placements. The cells may be further subdivided into sub-cells representing individual viewing window placements. Limits of individual sub-cells may be computed to determine limits of viewing window placements, and a plane may be fitted on the limits to generate the representation of feasible viewing window placement.

The modified placement component 108 may be configured to determine modified placement of the viewing window. Determining modified placement of the viewing window may include ascertaining, calculating, establishing, finding, identifying, and/or otherwise determining the modified placement of the viewing window. The modified placement of the viewing window may include one or more changes from the placement of the viewing window. The modified placement of the viewing window may include one or more changes in the placement of the viewing window. The modified placement of the viewing window may be determined for a particular moment/point in the progress length of the video by changing pitch angle and/or the yaw angle of the viewing window while maintaining the roll angle.

The modified placement of the viewing window may be determined based on the placement of the viewing window failing to satisfy the constraint model for the video and/or other information. A particular placement of the viewing window failing to satisfy the constraint model may include the particular placement of the viewing window being located outside the representation of feasible viewing window placement. A particular placement of the viewing window failing to satisfy the constraint model may include the particular placement of the viewing window not falling on the surface of the representation of feasible viewing window placement or being within the representation of feasible viewing window placement.

With the representation of feasible viewing window placement covering 180 degrees of roll angle, the viewing window placement for a particular roll angle may be checked to determine whether the pitch angle and the yaw angle results in viewing window placement extending beyond the constraint model. The decomposition of viewing window placement may first include roll angle before pitch angle and yaw angle. The representation of feasible viewing window placement covering 180 degrees of roll angle may change the feasibility test from a three-dimensional problem into a two-dimensional problem. IF a particular viewing window placement falls outside the constraint model, the viewing window placement may be projected along the same roll angle to the constraint model. For example, the viewing window placement may be projected to the closest point of the surface of the three-dimensional representation of feasible viewing window placement.

For example, the placement of the viewing window failing to satisfy the constraint model for the video may include a placement of the viewing window at a particular moment/point in the progress length extending beyond the surface of the three-dimensional representation of feasible viewing window placement. The modified placement of the viewing window may be determined for the particular moment/point to include a modified placement for the original placement of the viewing window. The modified placement may be determined to be located on the surface of the three-dimensional representation of feasible viewing window placement.

The modified placement of the viewing window may be determined to maintain the roll angle of the original placement of the viewing window. Responsive to the original placement of the viewing window including a particular roll angle, the modified placement for the original placement of the viewing window may be determined to include the same roll angle. The modified placement of the viewing window may be determined by changing the pitch angle and/or the yaw angle of the original placement of the viewing window. The pitch angle and/or the yaw angle of the original placement of the viewing window may be changed to position the modified placement on the closest point of the surface of the three-dimensional representation of feasible viewing window placement.

Figure 8:
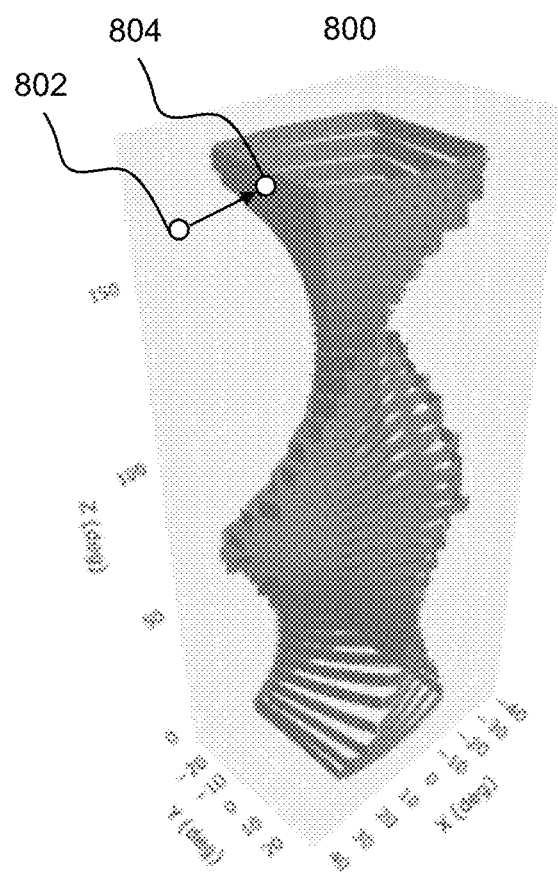
FIG. 8 illustrates an example projection to a surface of a constraint model.

FIG. 8 illustrates an example projection to a surface of a constraint model 800. Placement of a viewing window may be originally located at a point 802 outside the constraint model 800. The viewing window placement at the point 802 may be determined for a particular moment in a video (for a particular video frame) to apply horizon leveling and stabilization to the video. Such placement of the viewing window may result in the viewing window extending beyond the source field of view of the visual content. The viewing window placement may be projected from the point 802 to a point 804 on the surface of the constraint model 800. The point 804 may be a point of the constraint model 800 that is closest to the point 802 while being on the same Z-plane (same roll angle). The modified placement of the viewing window may result in the viewing window being located entirely within the source field of view of the visual content.

Figure 9:
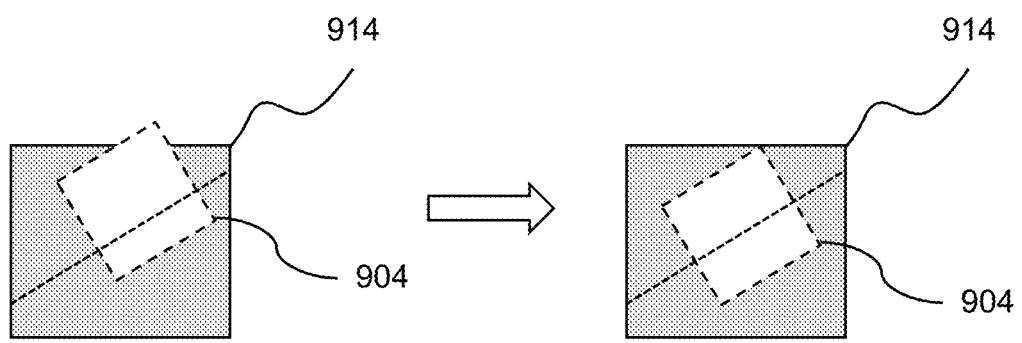
FIG. 9 illustrates an example change in placement of a viewing window.

FIG. 9 illustrates an example change in placement of a viewing window 904. An original placement of the viewing window may result in the viewing window 904 extending beyond the field of view of an image 914 (e.g., a video frame). The original placement of the viewing window may be determined to apply horizon leveling and stabilization to the image 914. A modified placement of the viewing window may result in the viewing window 904 being fully contained within the image 914. The modified placement of the viewing window may maintain the roll angle of the original placement to keep the same horizon leveling within the image 914. The modified placement of the viewing window may retain performance of horizon leveling at the extent of stabilization performance (e.g., keep the horizon leveled within the output video while allowing for more shakes within the video).

While FIG. 9 shows movement of the viewing window 904 with respect to the image 914, this is merely as an example and is not meant to be limiting. For example, the image (visual content) may be moved with respect to the viewing window to position the viewing window at the determined placement.

The generation component 110 may be configured to generate the horizon-leveled visual content. Horizon-leveled visual content may refer to visual content depicting a leveled scene. Horizon-leveled visual content may refer to visual content including depiction of a scene that is leveled with respect to ground, sea, earth, and/or the horizon. A horizon may refer to a line that appears to separate the visual content into two portions. A horizon may extend across majority or entirety of the visual content. For example, a horizon may refer to a line where the earth (e.g., ground, sea) appears to meet the sky. Horizon-leveled visual content may refer to visual content that depicts a scene which appears to have been captured by an upright image capture device (non-tilted image capture device).

the horizon-leveled visual content may be generated based on the modified placement of the viewing window and/or other information. The horizon-leveled visual content may include a punchout of the extents of the visual content defined by the viewing window. Inclusion of the extents of the visual content defined by the viewing window within the horizon-leveled visual content may effectuate horizon leveling of the visual content. Inclusion of the extents of the visual content defined by the viewing window within the horizon-leveled visual content may effectuate horizon leveling of the visual content via selective cropping. The spatial portions of the visual content that are cropped for horizon leveling may depend on the modified placement of the viewing window and/or other information.

The horizon-leveled visual content may be generated to provide a view in which the visual content is leveled (e.g., a horizon depicted within the visual content is leveled, visual content is leveled with respect to horizon). Horizon-leveling may include using smaller portions/extents of the visual content to provide a punchout view of the visual content that creates a more horizon-leveled view than when viewing the entirety of the visual content. Generation of horizon-leveled visual content may include using smaller spatial portions of the visual content (e.g., spatial portions of images/video frames defined by the viewing window) to provide a punchout view of the visual content. The horizon-leveled visual content may provide a more horizon-leveled view of the visual content than when the entirety of the visual content is presented.

In some implementations, the horizon-leveled visual content may further include stabilized visual content. The modified placement of the viewing widow may be determined to apply both horizon leveling and stabilization to the visual content. The horizon-leveled visual content may be generated to provide a view in which the visual content is both leveled and stabilized. The modified placement of the viewing window may be determined to prioritize horizon leveling over stabilization. The horizon-leveled visual content may include different stabilization performance (e.g., some parts of the video are more stabilized than other parts of the video) to maintain the performance of horizon leveling consistent within the video (e.g., horizon leveling remains consistent throughout the video).

In some implementations, horizon-leveled visual content may be generated as images/video frames including extents of the visual content defined by the viewing window. Horizon-leveled visual content may be generated as outputs of portions of the visual captured by the image capture device, with the outputted portions including extents of the visual content defined by the viewing window.

In some implementations, the horizon-leveled visual content may be generated as an encoded version/copy of the horizon-leveled visual content (e.g., encoded video file) and/or a director track that defines the extents of the visual content to be used during playback to provide a horizon-leveled view of the visual content. For example, the horizon-leveled visual content may be generated as video frames in a video file, and the video file may be opened in a video player for presentation of the horizon-leveled visual content. The horizon-leveled visual content may be generated as instructions to render the visual content for presentation. The instructions (e.g., director track) may define which spatial portions of the visual content (images, video frames) should be included within the presentation of the visual content. The instructions may define which spatial portions of the visual content should be included during playback to provide a horizon-leveled view of the visual content. The instructions may include information on the placement of the punchout of images/video frames to be used to as a function progress through the progress length of the visual content to provide a horizon-leveled view of the images/video frames. A video player may use the instructions to retrieve the relevant spatial portions of the images/video frames when the visual content is opened and/or is to be presented.

The generation component 110 may be configured effectuate storage of the horizon-leveled visual content and/or other information in one or more storage media. For example, the horizon-leveled visual content (e.g., video file, director track) may be stored in the electronic storage 13, remote storage locations (storage media located at/accessible through a server), and/or other locations. In some implementations, the generation component 110 may effectuate storage of the horizon-leveled visual content through one or more intermediary devices. For example, the processor 11 may be located within a computing device without a connection to the storage device (e.g., the computing device lacks WiFi/cellular connection to the storage device). The generation component 110 may effectuate storage of the horizon-leveled visual content through another device that has the necessary connection (e.g., the computing device using a WiFi/cellular connection of a paired mobile device, such as a smartphone, tablet, laptop, to store information in one or more storage media). Other storage locations for and storage of the horizon-leveled visual content are contemplated.

In some implementations, the processor 11 may represent multiple processors, and at least one of the processors may be a remote processor located remotely from the image capture device. One or more of the functionalities of the computer program components may be performed by the image capture device and/or by a remote processor. For example, modification of viewing window placement and/or horizon-leveled visual content generation may be performed by the remote processor during and/or post capture of the visual content by the image capture device. As another example, horizon-leveled visual content generation may be performed by the image capture device during capture of the visual content to provide the horizon-leveled visual content during capture of the visual content (e.g., as preview of visual content being captured presented on a display of the image capture device).

In some implementations, the visual content may not be horizon leveled in/near real time. For example, the image capture device may not have sufficient resource to apply the horizon leveling technique described herein in real-time and/or may be devoting its resources to other tasks. The horizon leveling of the visual content may be performed by the image capture device once sufficient resource becomes available. The horizon leveling of the visual content may be performed by the remote processor. For example, the remote processor may be one or more processors of a remote computing device (e.g., mobile device, desktop, server), and the remote processor may receive video information captured/generated by the image capture device. The remote computing device (software running on the remote computing device) may apply the horizon leveling technique described herein post capture of the visual content by the image capture device. The post-capture horizon leveling of the visual content may be performed by the remote processor responsive to reception of the video information, responsive to user/system command to horizon level the visual content, responsive to the visual content being opened for playback, and/or responsive to other conditions.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the disclosure has been described above using different figures, one or more features/functionalities described with respect to one figure is not limited to the one figure and may be applied to other aspects of the disclosure. For example, one or more features/functionalities described with respect to FIG. 1 may be applied may be applied to other aspects of the disclosure (e.g., as described with respect with other figures).

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
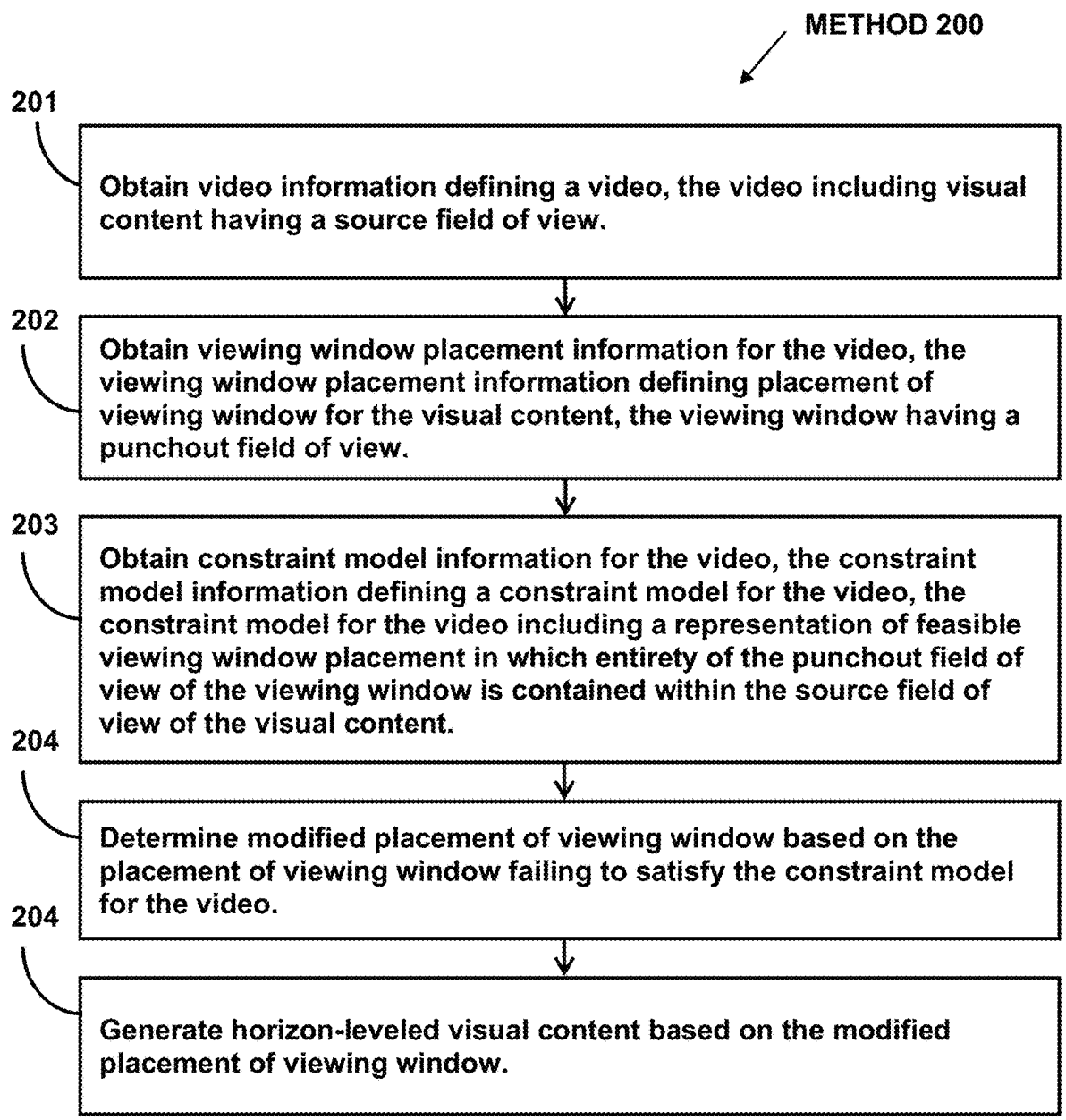
FIG. 2 illustrates an example method for horizon leveling videos.

FIG. 2 illustrates method 200 for horizon leveling videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video. The video may include video content having a progress length. The video content may include visual content having a source field of view. The source field of view may have a vertical dimension and a horizontal dimension. In some implementation, operation 201 may be performed by a processor component the same as or similar to the video component 102 (Shown in FIG. 1 and described herein).

At operation 202, viewing window placement information may be obtained. The viewing window placement information for the video may define placement of a viewing window for the visual content as the function of progress through the progress length. The viewing window may define extents of the visual content to be included within horizon-leveled visual content as the function of progress through the progress length. The viewing window may have a punchout field of view. The punchout field of view may have a diagonal dimension. In some implementation, operation 202 may be performed by a processor component the same as or similar to the placement component 104 (Shown in FIG. 1 and described herein).

At operation 203, constraint model information may be obtained. The constraint model information for the video may define a constraint model for the video. The constraint model for the video may include a representation of feasible viewing window placement in which entirety of the punchout field of view of the viewing window is contained within the source field of view of the visual content. The representation of feasible viewing window placement may be generated based on a roll-pitch-yaw axes representation of viewing window placement and the diagonal dimension of the punchout field of view fitting within the vertical dimension and the horizontal dimension of the source field of view of the visual content to cover 180 degrees of roll angle for the viewing window and enable full horizon leveling. In some implementation, operation 203 may be performed by a processor component the same as or similar to the constraint model component 106 (Shown in FIG. 1 and described herein).

At operation 204, modified placement of the viewing window may be determined based on the placement of the viewing window failing to satisfy the constraint model for the video and/or other information. In some implementation, operation 204 may be performed by a processor component the same as or similar to the modified placement component 108 (Shown in FIG. 1 and described herein).

At operation 205, the horizon-leveled visual content may be generated based on the modified placement of the viewing window and/or other information. The horizon-leveled visual content may include a punchout of the extents of the visual content defined by the viewing window. Inclusion of the extents of the visual content defined by the viewing window within the horizon-leveled visual content may effectuate horizon leveling of the visual content. In some implementation, operation 205 may be performed by a processor component the same as or similar to the generation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for horizon leveling videos, the system comprising:
   one or more physical processors configured by machine-readable instructions to:
   obtain video information defining a video, the video including video content having a progress length, the video content including visual content having a source field of view, the source field of view having a vertical dimension and a horizontal dimension;
   obtain viewing window placement information for the video, the viewing window placement information defining placement of a viewing window for the visual content as the function of progress through the progress length, the viewing window defining extents of the visual content to be included within horizon-leveled visual content as the function of progress through the progress length, the viewing window having a punchout field of view, the punchout field of view having a diagonal dimension;
   obtain constraint model information for the video, the constraint model information defining a constraint model for the video, the constraint model for the video including a three-dimensional representation of feasible viewing window placement in which entirety of the punchout field of view of the viewing window is contained within the source field of view of the visual content, the three-dimensional representation of feasible viewing window placement generated based on a roll-pitch-yaw axes representation of viewing window placement and the diagonal dimension of the punchout field of view fitting within the vertical dimension and the horizontal dimension of the source field of view of the visual content to cover 180 degrees of roll angle for the viewing window and enable full horizon leveling, the roll-pitch-yaw axes representation of viewing window placement including a three-dimensional vector with a roll angle component, a pitch angle component, and a yaw angle component;

determine modified placement of the viewing window based on the placement of the viewing window failing to satisfy the constraint model for the video, wherein the placement of the viewing window failing to satisfy the constraint model for the video includes a first placement of the viewing window extending beyond a surface of the three-dimensional representation of feasible viewing window placement; and generate the horizon-leveled visual content based on the modified placement of the viewing window, the horizon-leveled visual content including a punchout of the extents of the visual content defined by the viewing window, wherein inclusion of the extents of the visual content defined by the viewing window within the horizon-leveled visual content effectuates horizon leveling of the visual content.

2. The system of claim 1, wherein:

the modified placement of the viewing window is determined to maintain a roll angle of the placement of the viewing window, wherein responsive to the first placement of the viewing window including a first roll angle, the first modified placement for the first placement of the viewing window is determined to include the first roll angle; and the modified placement of the viewing window is determined to include change in a pitch angle and/or a yaw angle of the placement of the viewing window.

3. A system for horizon leveling videos, the system comprising:

one or more physical processors configured by machine-readable instructions to:

obtain video information defining a video, the video including video content having a progress length, the video content including visual content having a source field of view, the source field of view having a vertical dimension and a horizontal dimension;

obtain viewing window placement information for the video, the viewing window placement information defining placement of a viewing window for the visual content as the function of progress through the progress length, the viewing window defining extents of the visual content to be included within horizon-leveled visual content as the function of progress through the progress length, the viewing window having a punchout field of view, the punchout field of view having a diagonal dimension;

obtain constraint model information for the video, the constraint model information defining a constraint model for the video, the constraint model for the video including a representation of feasible viewing window placement in which entirety of the punchout field of view of the viewing window is contained within the source field of view of the visual content, the representation of feasible viewing window placement generated based on a roll-pitch-yaw axes representation of viewing window placement and the diagonal dimension of the punchout field of view fitting within the vertical dimension and the horizontal dimension of the source field of view of the visual content to cover 180 degrees of roll angle for the viewing window and enable full horizon leveling;

determine modified placement of the viewing window based on the placement of the viewing window failing to satisfy the constraint model for the video; and generate the horizon-leveled visual content based on the modified placement of the viewing window, the horizon-leveled visual content including a punchout of the extents of the visual content defined by the viewing window, wherein inclusion of the extents of the visual content defined by the viewing window within the horizon-leveled visual content effectuates horizon leveling of the visual content.

4. The system of 3, wherein the roll-pitch-yaw axes representation of viewing window placement includes a three-dimensional vector with a roll angle component, a pitch angle component, and a yaw angle component.

5. The system of 3, wherein the representation of feasible viewing window placement includes a three-dimensional representation of feasible viewing window placement.

6. The system of 5, wherein the placement of the viewing window failing to satisfy the constraint model for the video includes a first placement of the viewing window extending beyond a surface of the three-dimensional representation of feasible viewing window placement.

7. The system of 6, wherein the modified placement of the viewing window is determined to include a first modified placement for the first placement of the viewing window, the first modified placement located on the surface of the three-dimensional representation of feasible viewing window placement.

8. The system of 7, wherein the modified placement of the viewing window is determined to maintain a roll angle of the placement of the viewing window, wherein responsive to the first placement of the viewing window including a first roll angle, the first modified placement for the first placement of the viewing window is determined to include the first roll angle.

9. The system of 8, wherein the modified placement of the viewing window is determined to include change in a pitch angle and/or a yaw angle of the placement of the viewing window.

10. The system of 9, wherein the pitch angle and/or the yaw angle of the placement of the viewing window is changed to position the modified placement of the viewing window on a closest point of the surface of the three-dimensional representation of feasible viewing window placement.

11. The system of 3, wherein the diagonal dimension of the punchout field of view fitting within the vertical dimension and the horizontal dimension of the source field of view of the visual content includes the diagonal dimension of the punchout field of view being smaller than or equal to smaller of the vertical dimension and the horizontal dimension of the source field of view of the visual content.

12. A method for horizon leveling videos, the method performed by a computing system including one or more processors, the method comprising:

obtaining, by the computing system, video information defining a video, the video including video content having a progress length, the video content including visual content having a source field of view, the source field of view having a vertical dimension and a horizontal dimension;

obtaining, by the computing system, viewing window placement information for the video, the viewing window placement information defining placement of a viewing window for the visual content as the function of progress through the progress length, the viewing window defining extents of the visual content to be included within horizon-leveled visual content as the function of progress through the progress length, the viewing window having a punchout field of view, the punchout field of view having a diagonal dimension;

obtaining, by the computing system, constraint model information for the video, the constraint model information defining a constraint model for the video, the constraint model for the video including a representation of feasible viewing window placement in which entirety of the punchout field of view of the viewing window is contained within the source field of view of the visual content, the representation of feasible viewing window placement generated based on a roll-pitch-yaw axes representation of viewing window placement and the diagonal dimension of the punchout field of view fitting within the vertical dimension and the horizontal dimension of the source field of view of the visual content to cover 180 degrees of roll angle for the viewing window and enable full horizon leveling;

determining, by the computing system, modified placement of the viewing window based on the placement of the viewing window failing to satisfy the constraint model for the video; and generating, by the computing system, the horizon-leveled visual content based on the modified placement of the viewing window, the horizon-leveled visual content including a punchout of the extents of the visual content defined by the viewing window, wherein inclusion of the extents of the visual content defined by the viewing window within the horizon-leveled visual content effectuates horizon leveling of the visual content.

13. The method of 12, wherein the roll-pitch-yaw axes representation of viewing window placement includes a three-dimensional vector with a roll angle component, a pitch angle component, and a yaw angle component.

14. The method of 12, wherein the representation of feasible viewing window placement includes a three-dimensional representation of feasible viewing window placement.

15. The method of 14, wherein the placement of the viewing window failing to satisfy the constraint model for the video includes a first placement of the viewing window extending beyond a surface of the three-dimensional representation of feasible viewing window placement.

16. The method of 15, wherein the modified placement of the viewing window is determined to include a first modified placement for the first placement of the viewing window, the first modified placement located on the surface of the three-dimensional representation of feasible viewing window placement.

17. The method of 16, wherein the modified placement of the viewing window is determined to maintain a roll angle of the placement of the viewing window, wherein responsive to the first placement of the viewing window including a first roll angle, the first modified placement for the first placement of the viewing window is determined to include the first roll angle.

18. The method of 17, wherein the modified placement of the viewing window is determined to include change in a pitch angle and/or a yaw angle of the placement of the viewing window.

19. The method of 18, wherein the pitch angle and/or the yaw angle of the placement of the viewing window is changed to position the modified placement of the viewing window on a closest point of the surface of the three-dimensional representation of feasible viewing window placement.

20. The method of 12, wherein the diagonal dimension of the punchout field of view fitting within the vertical dimension and the horizontal dimension of the source field of view of the visual content includes the diagonal dimension of the punchout field of view being smaller than or equal to smaller of the vertical dimension and the horizontal dimension of the source field of view of the visual content.

* * * * *